A. P. BENNETT.
SNAP FASTENER.
APPLICATION FILED MAR. 2, 1915.
1,196,757.
Patented Sept. 5, 1916.
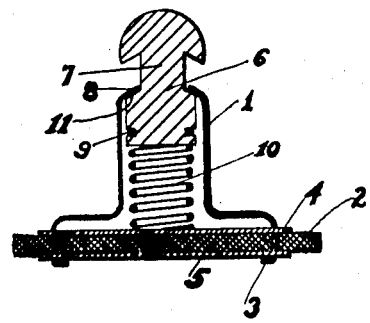
WITNESSES:
INVENTOR
BY
ATTORNEY

UNITED STATES PATENT OFFICE.

AUGUSTUS P. BENNETT, OF NEW YORK, N. Y.

SNAP-FASTENER.

1,196,757.  Specification of Letters Patent.  Patented Sept. 5, 1916.

Application filed March 2, 1915. Serial No. 11,449.

*To all whom it may concern:*

Be it known that I, AUGUSTUS P. BENNETT, a citizen of the United States, and a resident of the borough of Manhattan, city, county, and State of New York, have invented an Improvement in Snap-Fasteners, of which the following description, in connection with the accompanying drawing, is a specification, like letters on the drawing representing like parts.

The present invention relates to an improvement in snap fasteners, the object thereof being to provide a noiseless fastener which may be readily assembled.

One embodiment of my invention is illustrated in the single figure of the drawing which represents the male element of a preferred form of snap fastener in central vertical section.

Referring to the drawing, 1 indicates a housing attachable to a piece of fabric or other material 2 by suitable fastening means, as prongs 3 extending through registering slots in upper and lower plates 4 and 5 respectively, located on opposite sides of the fabric. A stud portion 6 may be movably mounted in the said housing 1 to coöperate with a female member not illustrated. This stud 6 may be provided with a shank portion 7 adapted to be retained by an inwardly turned flange 8 forming the upper portion of the housing 1, and with a shoulder portion 11 to engage the under side of said inwardly turned flange 8. The lower end of the stud 6 may also have a peripheral groove 9 to engage and retain one end of a helical spring 10, the other end of which bears against the base plate 4, thus pressing the shoulder 11 yieldingly against the under portion of the flange 8 and holding the stud 6 normally in its outermost position.

The structure hereinabove described and embodying my improvement in snap fasteners, accomplishes a two-fold object. In the first place, the spring pressed stud 6 is held firmly in contact with the flange 11 and may be depressed ordinarily only by positive pressure so that it is not free to rattle against the said flange. While this desirable result might also be accomplished by providing spring pressure against the butt of the stud 6, there would be considerable delay in assembling the various parts owing to the difficulty of handling a small detached spring. To obviate this, I have provided in the stud a peripheral groove 9 which retains one end of the spring thus simplifying the operation of assembling and also preventing accidental displacement of the parts after the structure is assembled.

I claim as my invention:

In a snap fastener, the combination of a housing having an inwardly turned flange portion, a stud having a shoulder portion to engage the under side of said inwardly turned flange portion, a spring adapted to press said stud portion normally into contact with said inwardly turned flange portion of the housing, and a peripheral groove in said stud portion adapted to retain one end of said spring.

In testimony whereof, I have signed my name to this specification, in the presence of two subscribing witnesses, this 26th day of February 1915.

AUGUSTUS P. BENNETT.

Witnesses:
G. ERNEST PHILFITT,
OTTO JORDAN.

Copies of this patent may be obtained for five cents each, by addressing the "Commissioner of Patents, Washington, D. C."